# (12) United States Patent
Guillon et al.

(10) Patent No.: US 8,101,148 B2
(45) Date of Patent: *Jan. 24, 2012

(54) PROCESS FOR THE PREPARATION OF MAGADIITE OR KENYAITE FROM AN ORGANIC STRUCTURING AGENT COMPRISING TWO TERMINAL ALCOHOL FUNCTIONS

(75) Inventors: Emmanuelle Guillon, Vernaison (FR); Nicolas Bats, Feyzin (FR); Antoine Fecant, Lyons (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/178,044

(22) Filed: Jul. 7, 2011

(65) Prior Publication Data

US 2011/0268640 A1 Nov. 3, 2011

Related U.S. Application Data

(63) Continuation of application No. 11/956,964, filed on Dec. 14, 2007, now Pat. No. 8,021,637.

(30) Foreign Application Priority Data

Dec. 15, 2006 (FR) ...................................... 06 10998

(51) Int. Cl.
*C01B 33/32* (2006.01)

(52) U.S. Cl. ...................................................... 423/326
(58) Field of Classification Search ........................ None
See application file for complete search history.

(56) References Cited

U.S. PATENT DOCUMENTS

| | | | | |
|---|---|---|---|---|
| 4,395,388 A | * | 7/1983 | Kaduk | ........................... 423/339 |
| 4,578,259 A | | 3/1986 | Morimoto et al. | |
| 4,980,333 A | | 12/1990 | Landis et al. | |
| 5,063,039 A | | 11/1991 | Valyocsik | |
| 7,166,656 B2 | | 1/2007 | Majumdar et al. | |
| 2005/0271582 A1 | * | 12/2005 | Barea et al. | ................... 423/709 |
| 2008/0152569 A1 | | 6/2008 | Guillon et al. | |

OTHER PUBLICATIONS

Feng et al., "Synthesis of Kenyaite, Magadiite and Octosilicate Using Poly(ethylene glycol) as a Template." Journal of Porous Materials, vol. 10, (2003) pp. 5-15.

* cited by examiner

*Primary Examiner* — Melvin Mayes
*Assistant Examiner* — Stefanie Cohen
(74) *Attorney, Agent, or Firm* — Millen, White, Zelano & Branigan, P.C.

(57) ABSTRACT

Described is a process for the preparation of a crystallised lamellar solid formed by magadiite consisting of implementing in a step (i) mixing of at least one silica source, at least one salt of N,N,N',N'-tetramethyl-N,N'-dibenzyloctanediammonium, at least one alkali and/or alkaline earth metal M and water and then implementing in a step (ii) hydrothermal treatment of said mixture until said crystallised lamellar solid constituted by magadiite is formed.

15 Claims, No Drawings"

PROCESS FOR THE PREPARATION OF MAGADIITE OR KENYAITE FROM AN ORGANIC STRUCTURING AGENT COMPRISING TWO TERMINAL ALCOHOL FUNCTIONS

This is a continuation of allowed U.S. patent application Ser. No. 11/956,964, filed Dec. 14, 2007 now U.S. Pat. No. 8,021,637.

FIELD OF THE INVENTION

The invention concerns the field of the preparation of solids formed by magadiite. These involve silicate-based lamellar solids also known by the name of lamellar solids of phyllosilicates or lamellar silicates type. The expression silicate-based lamellar solid is used to denote a solid compound formed by layers (or sheets) which are superposed but separated from each other by a distance varying between 2 and 5 Å, said sheets being formed by silica arranged in tetrahedric co-ordination ($SiO_4$). Elements other than silicon Si can be present in the solid, also in the tetrahedric position.

PRIOR ART

Among lamellar silicates, mention may be made of magadiite, natrosilite, kenyaite, makatite, nekoite, kanemite, okenite, dehayelite, macdonalite and rhodesite.

Those solids often exist in the natural state with a composition of the type $A_x Si_y O_z$, $nH_2O$, with $1 \leq x \leq 15$, $2 \leq y \leq 32$, $4 \leq z \leq 80$ and $0 \leq n \leq 20$ (x, y, z and n being rational numbers or integers), and A can be for example an element sodium or potassium. Such lamellar solids involve for example the composition $Na_2Si_{14}O_{29}\cdot 9H_2O$ for magadiite and the composition $Na_2Si_{20}O_{41}\cdot 10H_2O$ for kenyaite. The solids obtained by synthesis are of the same composition as the solids which are present in the natural state. Those lamellar silicates, in particular magadiite, often involve a three-dimensional structure with interactions of Van der Walls type between the sheets and a small specific surface area.

Those lamellar silicates and in particular magadiite have absorption and exchange properties which are of interest. Those solids are particularly suited for the adsorption of water or organic molecules and for cationic surface exchange. Recently, lamellar silicates have been widely studied in relation to their capacity to become an acid solid by protonic exchange. Other studies have also demonstrated that the introduction of pillars into the interlamellar spaces makes it possible to create a mesoporosity and to increase the specific surface area.

It is known from patent application WO 88/00091 to synthesise a bridged lamellar silicate from a lamellar silicate formed by synthesis magadiite which was prepared using an organic structuring agent which is selected from benzyltriethylammonium chloride, benzyltrimethylammonium chloride, dibenzyldimethylammonium chloride, N,N'-dimethylpiperazine, triethylamine or other quaternary compounds or heterocyclic amines.

It is also known from patent application WO 91/12204 to synthesise a crystallised lamellar silicate of kenyaite type using an organic compound selected from an alkylamine, a trialkylamine, a tetraalkylammonium compound and a diamine trimethylhexamethylenediamine, said alkyl having from 1 to 12 carbon atoms.

It is known from patent application EP-A-1 559 681 to synthesise lamellar solids based on silicates of kenyaite and magadiite type using an organic structuring agent selected from tyramine, 4-aminophenol, trans-4-aminocyclohexanol, 2-(4-amino-phenyl)-ethanol or other compounds comprising at least one alcohol group and at least one amine group which are separated by a hydrocarbon chain having from 1 to 20 carbon atoms.

BRIEF DESCRIPTION OF THE INVENTION

The invention concerns a process for the preparation of at least one crystallised lamellar solid selected from magadiite and kenyaite consisting of implementing in a step (i) mixing of at least one silica source, at least one organic structuring agent of the formula $HO-(CH_2)_n-OH$, with $2 \leq n \leq 5$, at least one alkali and/or alkaline earth metal M and water and then implementing in a step (ii) hydrothermal treatment of said mixture until at least said crystallised lamellar solid is formed. Advantageously said mixture formed in the course of said step (i) comprises at least one source of at least one element X involving tetrahedric coordinance and differing from silicon.

It was discovered that, surprisingly, an organic structuring agent comprising two terminal alcohol functions separated by the unit of a methylene chain —($CH_2$)— repeated 2 to 5 times, mixed with at least one silica source, at least one alkali and/or alkaline earth metal and water, leads to the production of at least one crystallised lamellar solid selected from magadiite and kenyaite. The process according to the invention is particularly advantageous as the crystallisation of at least said lamellar solid is effected in a few hours while the crystallisation time is generally reckoned in days for the production of magadiite or kenyaite in accordance with the processes in the prior art.

DETAILED DESCRIPTION OF THE INVENTION

The invention concerns a process for the preparation of at least one crystallised lamellar solid selected from magadiite and kenyaite consisting of implementing in a step (i) mixing of at least one silica source, at least one organic structuring agent of the formula $HO-(CH_2)_n-OH$, with $2 \leq n \leq 5$, at least one alkali and/or alkaline earth metal M and water and then implementing in a step (ii) hydrothermal treatment of said mixture until at least said crystallised lamellar solid is formed.

In accordance with the process of the invention the organic structuring agent used for carrying out said step (i) has two terminal alcohol functions separated by the unit of a methylene chain —($CH_2$)— repeated 2 to 5 times. Therefore the organic structuring agent involves the formula $HO-(CH_2)_n-OH$ in which n is an integer of between 2 and 5. Preferably n is equal to 2, 4 or 5. When n=2 the organic structuring agent used is ethylene glycol. When n=4 the organic structuring agent used is butane-1,4-diol and when n=5 said organic structuring agent used is pentane-1,5-diol. Very preferably the organic structuring agent is ethylene glycol. The organic structuring agent used in step (i) of the process of the invention is without any amine function or functions. In accordance with the highly preferred embodiment of the process of the invention in which the organic structuring agent is ethylene glycol, the crystallised lamellar solid obtained is either pure magadiite or pure kenyaite or a mixture of magadiite and kenyaite, preferably pure magadiite is obtained. In accordance with the process of the invention the magadiite and kenyaite are obtained alone, in the pure state, in the absence of any other crystallised or amorphous phase, or in the form of a mixture.

The alkali and/or alkaline earth metal M incorporated in step (i) of the preparation process according to the invention is selected from lithium, potassium, sodium and calcium and a mixture of at least two of those metals. Preferably said metal M is an alkali metal and very preferably it is sodium.

The silica source incorporated in step (i) of the preparation process according to the invention can be any one of those currently used in the synthesis of crystallised lamellar solids based on silicates, for example silica in powder form, silicic acid, colloidal silica, dissolved silica or tetraethoxysilane (TEOS). Among the silicas in powder form, it is possible to use precipitated silicas, in particular those obtained by precipitation from a solution of silicate of alkali metal such as pyrogenated silicas, for example "CAB-O-SIL" and silica gels. It is possible to use colloidal silicas involving different particle sizes, for example of a mean equivalent diameter of between 10 and 15 nm or between 40 and 50 nm, such as those commercialised under the registered marks such as "LUDOX". Preferably the silicon source is LUDOX.

In accordance with the process for the preparation of at least one crystallised lamellar solid according to the invention the mixture formed in the course of the step (i) advantageously comprises at least one source of at least one element X involving tetrahedric coordination and differing from silicon. More preferably the element X is selected from the group formed by aluminium, boron, chromium, iron, gallium, indium, nickel, zirconium, cobalt, titanium, zinc, copper, niobium and europium and a mixture of at least two of those elements. Still more preferably the element X is aluminium. The source of the element X may be any compound comprising the element X and capable of liberating that element in aqueous solution in reactive form. The element X can be incorporated into the mixture in an oxidated form XO, with $1 \leq a \leq 3$ (a being a rational number or an integer), or in any other form such as for example a diacetate of the element X, in particular $Co(CH_3COO)_2$, $Ni(CH_3COO)_2$, $Zn(CH_3COO)_2$, $Cu(CH_3COO)_2$, $Cr(CH_3COO)_2$ and $Eu(CH_3COO)_2$. When X is titanium, $Ti(EtO)_4$ is advantageously used, when X is zirconium, $Zr(OH)_4$ is advantageously used, and when X is niobium $Nb_2B_4O_7$ or $Nb_2O_5$ is advantageously used. In the preferred case where X is aluminium the alumina source is preferably sodium aluminate or an aluminium salt, for example chloride, nitrate, hydroxide or sulphate, an aluminium alkoxide or alumina in the true sense, preferably in hydrated or hydratable form, such as for example colloidal alumina, pseudoboehmite, gamma alumina or alpha or beta trihydrate. It is also possible to use mixtures of the abovementioned sources.

In accordance with the preparation process according to the invention the reaction mixture obtained in step (i) is of a chemical composition expressed in terms of moles of oxides by the following formula:

$$SiO_2 : wXO_n : xM^+OH^- : yH_2O : zR$$

w being between 0 and 0.5, preferably between 0 and 0.1, very preferably between 0.001 and 0.1 x being between 0.001 and 1, preferably between 0.01 and 0.6, y being between 10 and 100, z being between 0.05 and 15, preferably between 0.1 and 5, and very preferably between 1.4 and 3, a being between 1 and 3, and in which X is at least one element involving tetrahedric coordinance and differing from silicon, preferably selected from the group formed by aluminium, boron, chromium, iron, gallium, indium, nickel, zirconium, cobalt, titanium, zinc, copper, niobium and europium and the mixture of at least two of those elements, still more preferably X is aluminium, M is at least one cation selected from lithium, potassium, sodium and calcium and a mixture of at least two of those metals, preferably sodium, R the organic structuring agent of the formula $HO-(CH_2)_n-OH$, $2 \leq n \leq 5$. w, x, y and z respectively represent the number of moles of $XO_a$, $M^+OH^-$, $H_2O$ and R.

In accordance with step (ii) of the process of the invention the hydrothermal treatment of the reaction mixture is effected until at least said crystallised lamellar solid selected from magadiite and kenyaite is formed. The reaction mixture is advantageously put under hydrothermal conditions under an autogenous reaction pressure, possibly with the addition of gas, for example nitrogen, at a crystallisation temperature of between 100 and 200° C., preferably between 150° C. and 190° C., until formation of the lamellar crystals of magadiite and/or kenyaite occurs. The period of time necessary to achieve crystallisation generally varies between 10 and 48 hours, preferably between 15 and 30 hours. During the duration of crystallisation step (ii) the reaction mixture can be vigorously agitated or may not be.

Preferably the product obtained at the end of the crystallisation step (ii) is subjected to at least one of the following steps and preferably all of the following steps:

(iii) a step for separation of at least said crystallised lamellar solid from the crystallisation mixture, (iv) a step of washing at least said crystallised lamellar solid, and (v) a step of drying at least said crystallised solid.

The crystallised solid is generally separated from the mixture in accordance with step iii) of the preparation process according to the invention by any method known to the man skilled in the art such as filtration. The solid is then washed with water in accordance with step iv) of the process of the invention, preferably using deionised water. Step v) is generally carried out at a temperature of between 50 and 150° C. for a period ranging from 12 to 30 hours. The drying operation is preferably effected at atmospheric pressure but it may also be carried out under pressure. At the end of all those steps the result obtained is at least one crystallised lamellar solid formed by magadiite and/or kenyaite.

In accordance with the invention it is advantageous to carry out a cationic exchange operation in respect of the alkali and/or alkaline earth metal introduced in the course of said step i) of the process for the preparation of at least said crystallised lamellar solid, said cationic exchange being carried out with hydrogen ions at the end of step v) for drying at least said lamellar solid. That cationic exchange with protons imparts acidity to the crystallised lamellar solid formed by magadiite and/or kenyaite.

The following examples illustrate the invention without limiting the scope thereof.

Example 1

Synthesis of Silicic Magadiite 32.20 g of a colloidal silica suspension known by the commercial name Ludox HS-40 and marketed by Aldrich is incorporated into a solution composed of 2.15 g of sodium hydroxide (prolabo) and 21.03 g of ethylene glycol (>99%, Aldrich) in 60.50 g of deionised water. The mixture is vigorously agitated for half an hour. The mixture is then transferred, after homogenisation, into an autoclave. The autoclave is heated for 20 hours at 175° C. with agitation. The crystallised product obtained is filtered, washed with deionised water (to reach a neutral pH) and then dried for one night at 100° C.

The diffractogram (DRX) carried out on that product is characteristic of pure magadiite.

Example 2

Synthesis of Silicic Magadiite 27.53 g of a colloidal silica suspension known by the commercial name Ludox HS-40 and marketed by Aldrich is incorporated into a solution composed of 1.84 g of sodium hydroxide (prolabo) and 42.87 g of ethylene glycol (>99%, Aldrich) in 45.82 g of deionised water. The mixture is vigorously agitated for half an hour. The mixture is then transferred, after homogenisation, into an autoclave. The autoclave is heated for 20 hours at 175° C. with agitation. The crystallised product obtained is filtered, washed with deionised water (to reach a neutral pH) and then dried for one night at 100° C.

The diffractogram (DRX) carried out on that product is characteristic of pure magadiite.

Example 3

Synthesis of Magadiite Substituted with Aluminium 32.16 g of a colloidal silica suspension known by the commercial name Ludox HS-40 and marketed by Aldrich is incorporated into a solution composed of 1.99 g of sodium hydroxide (prolabo), 0.172 g of sodium aluminate (carlo erba) and 21.01 g of ethylene glycol (>99%, Aldrich) in 60.63 g of deionised water. The mixture is vigorously agitated for half an hour. The gel formed in that way has an Si/Al ratio of 60. The mixture is then transferred, after homogenisation, into an autoclave. The autoclave is heated for 20 hours at 175° C. with agitation. The crystallised product obtained is filtered, washed with deionised water (to reach a neutral pH) and then dried for one night at 100° C.

The diffractogram (DRX) carried out on that product is characteristic of pure magadiite.

Example 4

Synthesis of Magadiite Substituted with Aluminium 25.58 g of a colloidal silica suspension known by the commercial name Ludox HS-40 and marketed by Aldrich is incorporated into a solution composed of 1.55 g of sodium hydroxide (prolabo), 0.109 g of sodium aluminate (carlo erba) and 23.89 g of butane-1,4-diol (99%, Aldrich) in 47.88 g of deionised water. The mixture is vigorously agitated for half an hour. The gel formed in that way has an Si/Al ratio of 130. The mixture is then transferred, after homogenisation, into an autoclave. The autoclave is heated for 24 hours at 160° C. with agitation. The crystallised product obtained is filtered, washed with deionised water (to reach a neutral pH) and then dried for one night at 100° C.

The diffractogram (DRX) carried out on that product is characteristic of pure magadiite.

Example 5

Synthesis of Silicic Kenyaite 24.70 g of a colloidal silica suspension known by the commercial name Ludox HS-40 and marketed by Aldrich is incorporated into a solution composed of 1.55 g of sodium hydroxide (prolabo) and 26.63 g of pentane-1,5-diol (96%, Aldrich) in 46.917 g of deionised water. The mixture is vigorously agitated for half an hour. The mixture is then transferred, after homogenisation, into an autoclave. The autoclave is heated for 16 hours at 175° C. with agitation. The crystallised product obtained is filtered, washed with deionised water (to reach a neutral pH) and then dried for one night at 100° C.

The diffractogram (DRX) carried out on that product is characteristic of pure kenyaite.

Example 6

Synthesis of Kenyaite Substituted with Aluminium 24.66 g of a colloidal silica suspension known by the commercial name Ludox HS-40 and marketed by Aldrich is incorporated into a solution composed of 1.49 g of sodium hydroxide (prolabo), 0.105 g of sodium aluminate (carlo erba) and 26.60 g of pentane-1,5-diol (96%, Aldrich) in 46.11 g of deionised water. The mixture is vigorously agitated for half an hour. The gel formed in that way has an Si/Al ratio of 130. The mixture is then transferred, after homogenisation, into an autoclave. The autoclave is heated for 24 hours at 160° C. with agitation. The crystallised product obtained is filtered, washed with deionised water (to reach a neutral pH) and then dried for one night at 100° C.

The diffractogram (DRX) carried out on that product is characteristic of pure kenyaite.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The preceding examples can be repeated with similar success by substituting the generically or specifically described reactants and/or operating conditions of this invention for those used in the preceding examples.

The entire disclosures of all applications, patents and publications, cited herein and of corresponding French application No. 06/10.998, filed Dec. 15, 2006 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the preparation of at least one crystallised lamellar solid selected from magadiite and kenyaite comprising implementing in a step (i) mixing of at least one silica source, at least one organic structuring agent of the formula HO—$(CH_2)_n$—OH, with $2 \leq n \leq 5$, at least one alkali and/or alkaline earth metal M and water and then implementing in a step (ii) hydrothermal treatment of said mixture until at least said crystallised lamellar solid of magadiite or kenyaite is formed.

2. A preparation process according to claim 1, said organic structuring agent comprising ethylene glycol, butane-1,4-diol or pentane-1,5-diol.

3. A preparation process according to claim 2, said organic structuring agent comprising ethylene glycol.

4. A preparation process according to claim 3, said alkali and/or alkaline earth metal M comprising sodium.

5. A preparation process according to claim 4, said silica source incorporated in said step (i) comprising a colloidal silica.

6. A preparation process according to claim 5, further comprising admixing aluminum in step (i).

7. A preparation process according to claim 1, said alkali and/or alkaline earth metal M comprising lithium, potassium, sodium or calcium or a mixture of at least two of said metals.

8. A preparation process according to claim 7, said alkali and/or alkaline earth metal M comprising sodium.

9. A preparation process according to claim 1, wherein said silica source is incorporated in said step (i) comprising a colloidal silica.

10. A preparation process according to claim 1, wherein said mixture formed in the course of said step (i) comprises at least one source of at least one element X involving tetrahedral coordinance and differing from silicon.

11. A preparation process according to claim 10, wherein said element X is aluminium.

12. A preparation process according to claim 1, wherein the resultant reaction mixture obtained in said step (i) is of a chemical composition expressed in terms of moles of oxides by the following formula:

$$SiO_2:wXO_a:xM^+OH^-:yH_2O:zR$$

w being between 0 and 0.5, x being between 0.001 and 1, y being between 10 and 100, z being between 1.4 and 3, a being between 1 and 3, and in which X is at least one element of tetrahedral coordinance and differing from silicon, M is at least one cation selected from lithium, potassium, sodium and calcium and a mixture of at least two of those metals, R represents the organic structuring agent of the formula $HO-(CH_2)_a-OH$, $2 \leq n \leq 5$, w, x, y and z respectively representing the number of moles of $XO_a$, $M^+OH^-$, $H_2O$ and R.

13. A preparation process according to claim 1, wherein said step (ii) is carried out by subjecting said reaction mixture to hydrothermal conditions under an autogenous reaction pressure at a crystallisation temperature of between 100 and 200° C.

14. A preparation process according to claim 1, wherein said hydrothermal treatment in step (ii) is conducted for 10-48 hours.

15. A preparation process according to claim 1, further comprising subjecting said product resulting from said crystallisation step (ii) to at least:
   (iii) a step for separation of at least said crystallised lamellar solid from the crystallisation mixture,
   (iv) a step of washing at least said crystallised lamellar solid, and
   (v) a step of drying at least said crystallised solid.

* * * * *

UNITED STATES PATENT AND TRADEMARK OFFICE
CERTIFICATE OF CORRECTION

PATENT NO. : 8,101,148 B2
APPLICATION NO. : 13/178044
DATED : January 24, 2012
INVENTOR(S) : Emmanuelle Guillon et al.

It is certified that error appears in the above-identified patent and that said Letters Patent is hereby corrected as shown below:

Column 8, line 6 reads: "agent of the formula $HO\text{-}(CH_2)_a\text{-}OH, 2 \leq n \leq 5, w, x,$"
Should read: -- agent of the formula $HO\text{-}(CH_2)_n\text{-}OH, 2 \leq n \leq 5, w, x,$ --.

Signed and Sealed this
Third Day of April, 2012

David J. Kappos
*Director of the United States Patent and Trademark Office*